United States Patent
Maufer

(10) Patent No.: US 7,522,540 B1
(45) Date of Patent: Apr. 21, 2009

(54) EXTENDED SERVICE SET MESH TOPOLOGY DISCOVERY

(75) Inventor: Thomas A. Maufer, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 659 days.

(21) Appl. No.: 11/106,764

(22) Filed: Apr. 15, 2005

(51) Int. Cl.
H04L 12/28 (2006.01)
H04L 12/56 (2006.01)

(52) U.S. Cl. ............... 370/254; 370/392; 370/401

(58) Field of Classification Search ......... 370/252, 370/254–256, 351, 389, 392, 400, 401
See application file for complete search history.

(56) References Cited

U.S. PATENT DOCUMENTS

| | | | |
|---|---|---|---|
| 5,101,348 A | | 3/1992 | Arrowood et al. |
| 5,204,858 A | * | 4/1993 | Kinashi et al. ............ 370/400 |
| 5,519,704 A | | 5/1996 | Farinacci et al. |
| 5,790,541 A | * | 8/1998 | Patrick et al. ............. 370/392 |
| 6,141,336 A | | 10/2000 | Bauchot et al. |
| 6,367,009 B1 | * | 4/2002 | Davis et al. .............. 713/166 |
| 6,697,325 B1 | | 2/2004 | Cain |
| 6,721,290 B1 | | 4/2004 | Kondylis et al. |
| 7,031,288 B2 | * | 4/2006 | Ogier ...................... 370/338 |
| 7,136,392 B2 | | 11/2006 | Wentink |
| 7,233,574 B2 | * | 6/2007 | Worfolk et al. ........... 370/238 |
| 7,366,113 B1 | * | 4/2008 | Chandra et al. ........... 370/255 |
| 2002/0072363 A1 | * | 6/2002 | Riihinen et al. ........... 455/432 |
| 2002/0122409 A1 | | 9/2002 | Kandala |
| 2004/0235484 A1 | | 11/2004 | Korpela et al. |
| 2005/0063419 A1 | * | 3/2005 | Schrader et al. ........... 370/466 |
| 2005/0070264 A1 | * | 3/2005 | Backes et al. ............. 455/418 |
| 2005/0078651 A1 | | 4/2005 | Lee et al. |
| 2005/0152333 A1 | | 7/2005 | Smith |
| 2005/0243765 A1 | * | 11/2005 | Schrader et al. ........... 370/328 |
| 2006/0041683 A1 | * | 2/2006 | Subramanian et al. ..... 709/245 |
| 2006/0126611 A1 | | 6/2006 | Kelly et al. |
| 2006/0212582 A1 | * | 9/2006 | Gupta et al. .............. 709/227 |
| 2006/0268908 A1 | * | 11/2006 | Wang et al. .............. 370/401 |
| 2007/0197262 A1 | | 8/2007 | Smith et al. |
| 2008/0062941 A1 | | 3/2008 | Rhee et al. |

* cited by examiner

*Primary Examiner*—Hong Cho
(74) *Attorney, Agent, or Firm*—Patterson & Sheridan, LLP

(57) ABSTRACT

A system and methods for wireless computing devices to become mesh member nodes within a self-configuring mesh network includes mechanisms for neighbor discovery and sharing of a common topology database including mesh topology and mesh network information. Each mesh node may use the topology database to determine optimized routing paths within the mesh network. Mesh member nodes are configured to detect and communicate topology changes and measured mesh network attributes to other members of the self-configuring wireless network.

17 Claims, 11 Drawing Sheets

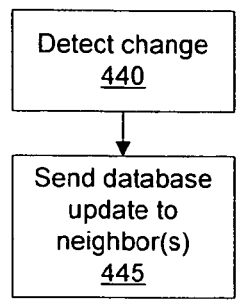
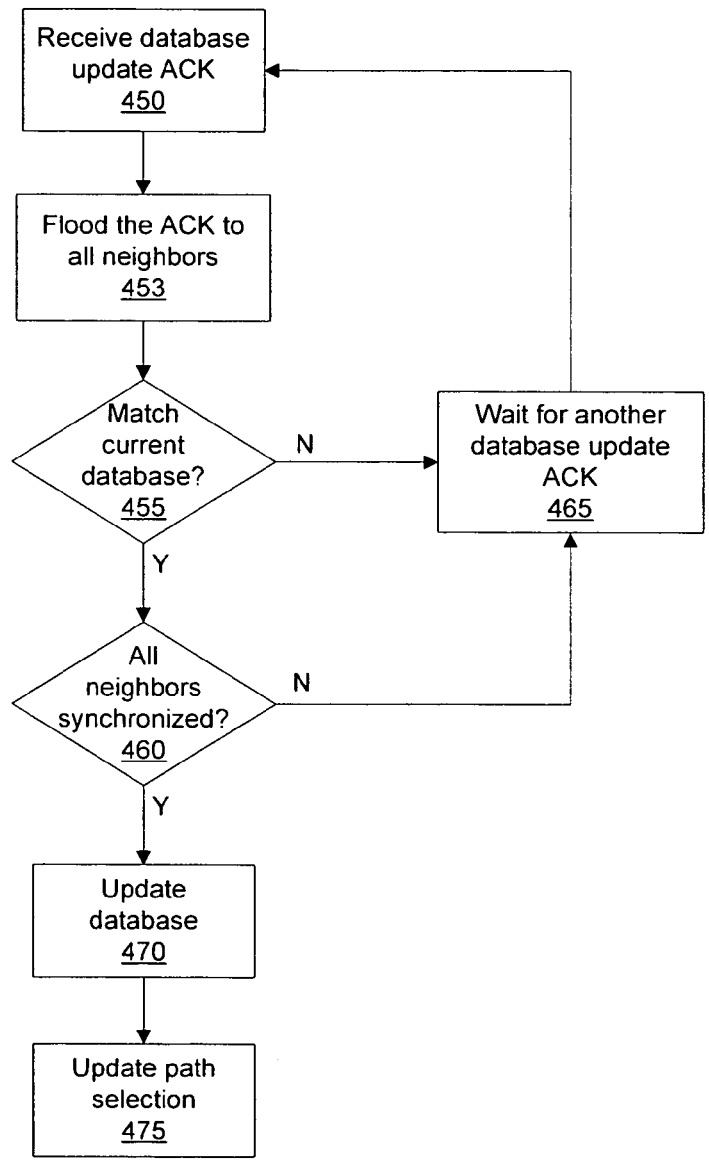

EXTENDED SERVICE SET MESH TOPOLOGY DISCOVERY

BACKGROUND OF THE INVENTION

1. Field of the Invention

Embodiments of the present invention generally relate to wireless communications. More particularly, this invention relates to establishing, operating, and maintaining self-configuring wireless mesh networks.

2. Description of the Related Art

Conventional wireless communications are undergoing very rapid growth, a growth that has necessitated standardizing communications protocols. A desirable feature as wireless networks become larger and more complex is to enable self-configuring wireless mesh networks that automatically configure mesh-capable wireless clients to form an extended service set (ESS) that provides data communications both within the mesh itself and externally through wired networks.

Wireless communications have distinct advantages in that they can be deployed very rapidly with little or no infrastructure support. For example, a standardized self-configuring wireless mesh network could enable mobile clients to enter and join the wireless mesh and to benefit from data communications while moving within the mesh.

Unfortunately, self-configuring mesh networks have practical implementation problems due to their dynamic nature. For example, a given self-configuring mesh network may expand, adding clients, such that it would overburden the mesh's ability to service the mesh clients. Simply keeping track of the clients in a wireless mesh network may become very difficult or impossible to do. Furthermore, a protocol for self-configuring mesh clients to select paths in multi-hop mesh topologies may be needed, including support for broadcast, multicast, and unicast traffic. While message routing issues are always of concern in data communications, because wireless networks have lower bandwidth than wired networks, selecting optimal routing paths is particularly important in wireless mesh networks.

Accordingly, mechanisms are needed to enable mesh clients to leave and to join the mesh network and communicate mesh topology information within the mesh network. Furthermore, mechanisms are needed to determine efficient routing paths based on the mesh topology information.

SUMMARY OF THE INVENTION

The current invention involves new systems and methods for a self-configuring mesh network including wireless clients. Some embodiments of the present invention include a mechanism that enables mesh members to leave and to join the mesh network. Some embodiments of the present invention include a mechanism that communicates mesh topology information within the mesh. Some embodiments of the present invention include a mechanism that communicates mesh network information, including mesh network attributes such as distance, number of message hops, link bandwidths, available frequencies, antenna gain, antenna directivity, signal noise, signal-to-noise ratios, available transmit power, the number of recent retransmissions, RSSI, radio channel bandwidths, and radio channel selectivity. Some embodiments of the present invention use the mesh network information for path selection.

Various embodiments of the invention include a method for joining a self-configuring mesh. The method includes sending a first meshHello message from a wireless station to a neighboring mesh node within the self-configuring mesh, receiving a second meshHello message generated by the neighboring mesh node, determining whether the second meshHello message includes a first neighbor list that includes the station, and adding the neighboring mesh node to a second neighbor list stored in the wireless station.

Various embodiments of the invention include a method for discovering a topology of a mesh. The method includes receiving a first meshHello message sent by a wireless station neighboring a mesh node within the mesh, adding the wireless station to a list of neighbors, and sending the list of neighbors to the wireless station. The list of neighbors is stored within the mesh node and specifies a portion of the topology of the mesh.

Various embodiments of the invention include a method for transmitting a message received by a mesh node within a self-configuring wireless mesh networking system. The method includes extracting a destination address from a header of the message, determining a next-hop mesh node to reach a mesh node corresponding to the destination address, inserting a transmitter address into the header of the message, and transmitting the message to the next-hop mesh node. The transmitter address corresponds to the mesh node.

Various embodiments of the invention include a self-configuring wireless client configured to communicate with a neighboring mesh node to join a mesh system, store and transmit a neighbor list, and exchange information specifying a topology of the mesh system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4B illustrates an embodiment of a method for initiating a topology database update in accordance with one or more aspects of the present invention.

FIG. 4C illustrates an embodiment of a method for processing a topology database update in accordance with one or more aspects of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

A self-configuring mesh network includes mechanisms for candidate wireless mesh members to self-configure to provide an ESS mesh network, to join and leave the mesh, communicate data and messages, select optimal multi-hop routing paths, and share topology information. Mesh network information including attributes such as distance, number of message hops, link bandwidths, available frequencies, antenna gain, antenna directivity, signal noise, signal-to-noise ratios, available transmit power, the number of recent retransmissions, RSSI, radio channel bandwidths, and radio channel selectivity, and even the number of locally associated stations (which is an indicator of how busy a mesh member node might become) may be communicated and used during path selection. Additionally, optional metrics such as RSSI variability, weighted signal-to-noise ratios, weighted utilization, a number of alternate paths through a given mesh member node, frame error rates, weighted error rates, weighted signal strengths, and inter-mesh node link speed may be computed and included in the mesh network information. Furthermore, an efficient method of handling inter-mesh node communications (i.e., forwarding traffic on behalf of non-locally associated stations) uses a contention-free feature that is compatible with the IEEE 802.11 protocol.

An Exemplary System

Figure 1A:
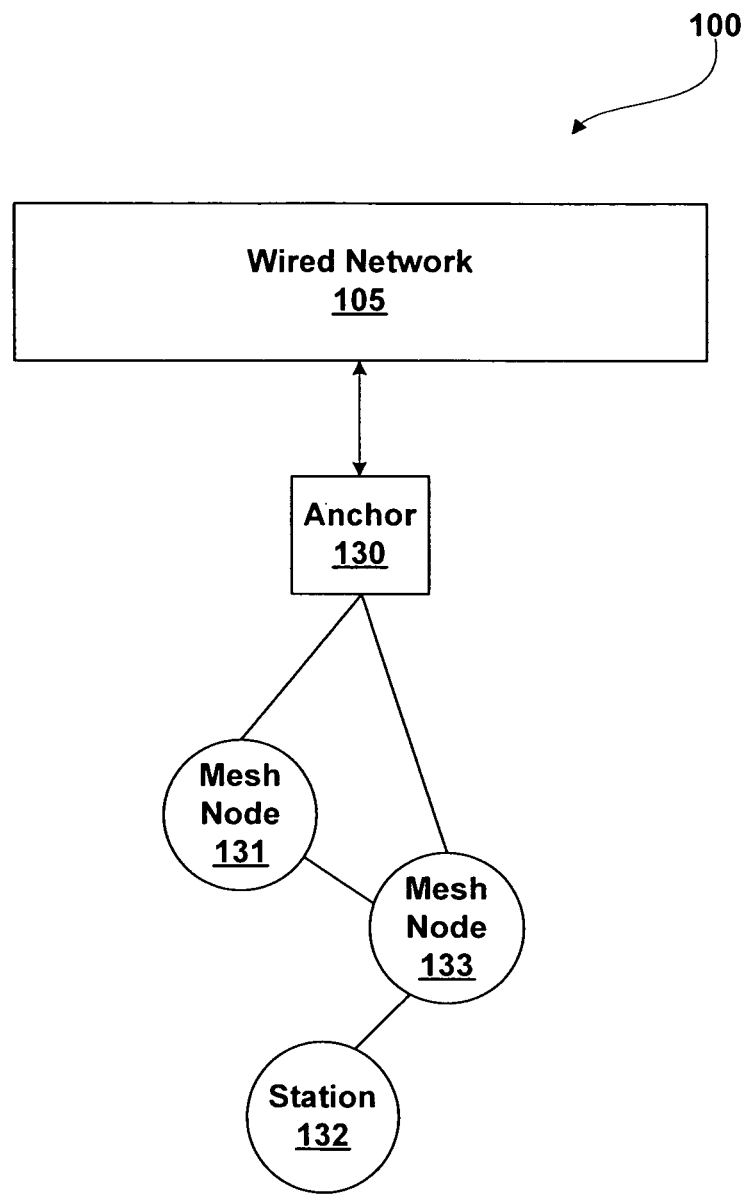
FIGS. 1A, 1B, and 1C are diagrams of self-configuring mesh networking systems in accordance with one or more aspects of the present invention.

FIG. 1A is an illustration of a self-configuring mesh networking system, system 100, in accordance with one or more aspects of the present invention. System 100 includes one or more wireless mesh clients self-configured as mesh-aware access points, such as mesh member nodes 131 and 133. Each mesh member node is typically a portable wireless device that may be coupled to a permanent power supply or rely on a temporary power supply, e.g., a battery or a fuel cell. Another wireless mesh member node, specifically anchor 130, is coupled to a wired distribution system, such as a wired network 105, and is self-configured as mesh border access points, known in this invention as an anchor. An anchor is typically a wireless device coupled to a permanent power supply, such as a desktop computing system, server, or the like. An anchor permits abstraction of a portion of the self-configuring wireless mesh network when viewed from wired network 105. A mesh networking system may include one or more anchors. Anchors facilitate subdivision of a network and permit more efficient scaling of the network, as described further herein. Mesh member nodes within an anchor tree share an anchor identifier. For example, anchor 130, mesh node 131, mesh node 133, and station 132 may share an anchor identifier and form an anchor-rooted unicast tree. If a mesh member associates with a member node that is part of a tree rooted to a different anchor, it will receive a new anchor identifier. All the nodes in the mesh share the same extended service set identifier (ESSID), essentially the "name" of the wireless local area network (LAN).

A wireless mesh client, such as station 132, is coupled to mesh node 133 and may become a mesh member node upon completion of self-configuration, as described below in conjunction with FIG. 2. Alternatively, station 132 may function as a legacy station, serving as an endpoint of the mesh and sending data to and receiving data from other mesh member nodes and clients of wired network 105 via mesh node 133. In such situations, station 132 may not be mesh-enabled and may function only as a station that is not mesh-aware. Wireless mesh member nodes may be "permanent" components of system 100, they may each move within system 100, or they may leave system 100. Self-configuring mesh member nodes may be used to wirelessly extend an existing wired or wireless network within a house, office building, campus, airport, or the like, requiring minimal if any manual configuration. Each mesh member node maintains a local copy of a topology database reflecting the topology of the anchor tree for anchor 130. Station 132 does not maintain a topology database, but may transmit and receive frames as a wireless mesh member of system 100.

System 100 may be configured for unicast communications, broadcast messaging, and multicast messaging. During unicast communications a first mesh member node may communicate with a second mesh member node or with a device that is connected to the internet via wired network 105. Anchor 130 provides a tree for unicast frame forwarding, where the tree is constructed based on the topology described in the topology database. Each anchor "owns" a set of station MAC addresses that share the anchor's identifier and which are connected to the anchor via a chain of mesh member nodes that are rooted to a given anchor's tree. Any mesh member node may match each frame's source and destination addresses against its topology database to determine whether or not to forward the frame. This prevents the formation of a multicast forwarding loop between the wired network and the self-configuring mesh.

When anchor 130 receives unicast traffic for mesh member nodes within its tree, anchor 130 forwards the traffic to the destination mesh member node, e.g., mesh node 131, mesh node 133, or station 132. When anchor 130 receives broadcast traffic or unicast/multicast traffic for an unknown destination, anchor 130 may flood the traffic to the mesh member nodes within its tree, such that each mesh member nodes receives one copy of each flooded transmission.

Figure 1B:
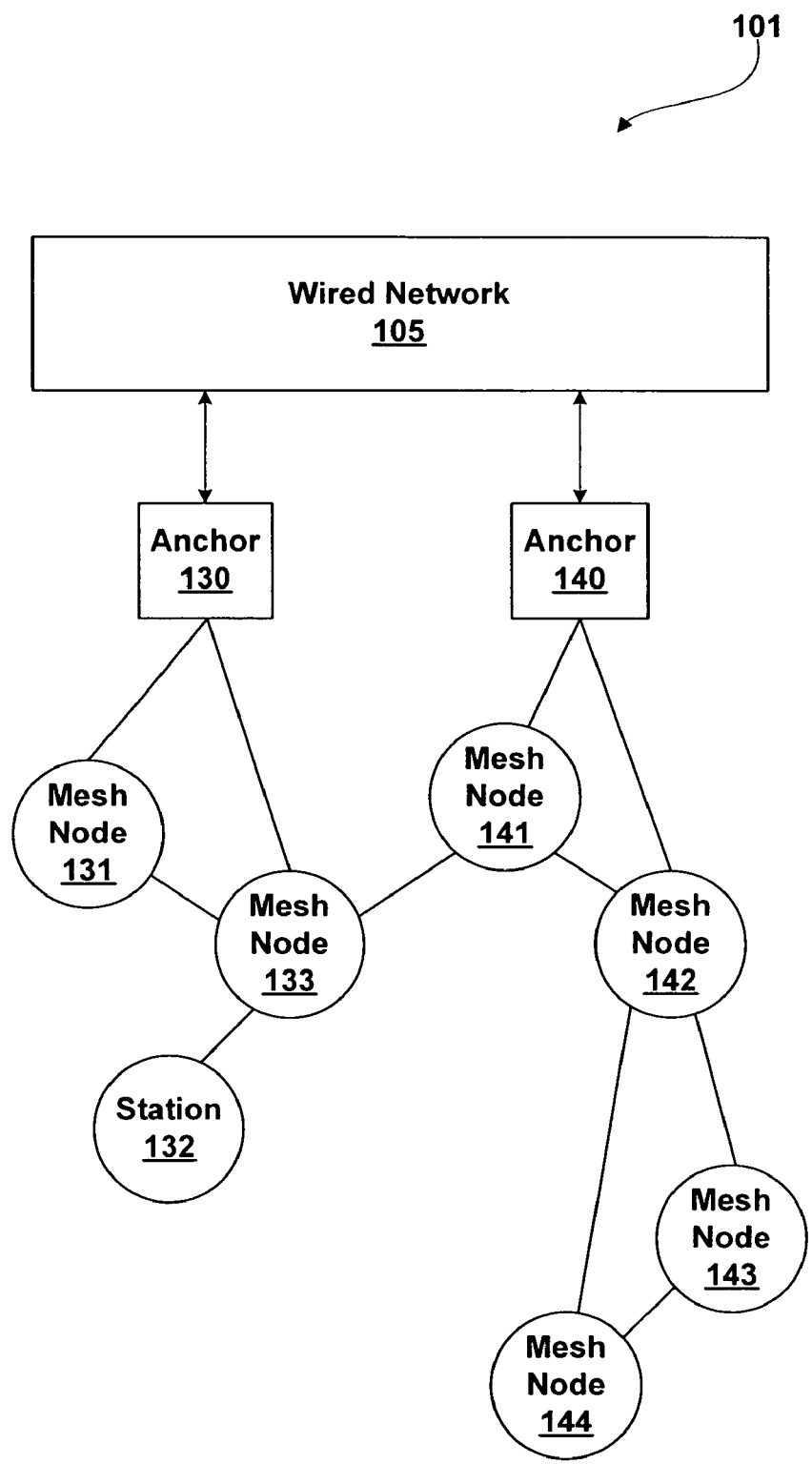

FIG. 1B is an illustration of a self-configuring mesh networking system, system 101, in accordance with one or more aspects of the present invention. System 101 includes anchor 130 and mesh nodes 131, 133, and station 132 of FIG. 1A. System 101 also includes additional wireless mesh member nodes (i.e., self-configured as mesh-aware access points), specifically anchor 140 and mesh member nodes 141, 142, 143, and 144. Anchor 130 and anchor 140 are wired neighbors, and are each listed in the other's neighbor list. Mesh node 133 and mesh node 141 are wireless neighbors, and are each listed in the other's neighbor list. Although mesh node 133 and mesh node 141 may transmit traffic between each other, they are not part of each others' anchor trees. This means that neither of these mesh member nodes has detailed topology information about the connectivity on the other anchor's tree, but in one embodiment of this invention the "shortcut neighbors" could exchange a list of what MAC addresses are local to their anchor's tree. In the event that such information were available, either mesh node 133 or 141 could make a judgment that a frame was reachable in the neighboring tree, or was likely to be outside the wireless local area network (WLAN). In the latter case, the best strategy would be to flood the frame within the local tree, knowing it will eventually reach the anchor.

Anchor 130, mesh nodes 131, 133, and station 132 may share a mesh identifier that is different that a mesh identifier shared by anchor 140 and mesh nodes 141, 142, 143, and 144. A mesh identifier is created by the first mesh node in a self-configuring wireless mesh network and may be either the anchor's own MAC address or a randomly generated MAC address. The anchor identifier could even be a number that is not formatted like a MAC address.

Like system 100, system 101 may be configured for unicast communications, broadcast messaging, and multicast messaging. Each anchor, such as anchor 130 or 140, provides a tree for unicast frame forwarding such that unicast traffic may be load balanced between the anchors within system 101, in that some traffic will be using anchor 130 to access the wired LAN, and other traffic will be using anchor 140. Note that all multicast and broadcast traffic will be limited to just one anchor for ingress to and egress from the WLAN mesh. The anchors are meaningful for tree construction, permitting sub-division of the self-configuring wireless mesh network for improved scalability and more efficient use of the available wireless bandwidth.

Broadcast messages are flooded to all mesh member nodes within system 101, and multicast communications are transmitted to a selected plurality of mesh member nodes within system 101 (only those member nodes that have an associated station that has joined a group will see traffic for that group). A single spanning tree of system 100 for broadcast communications, a broadcast tree, is defined for broadcast distribution such that all mesh anchors are in the same broadcast domain, and multicast trees are subsets of the broadcast tree. The broadcast tree is rooted at one anchor for the purpose of ingress/egress (and it includes all mesh member nodes . . . in the event that the tree becomes partitioned, another anchor will take over for each sub-tree as its ingress/egress point), and the same anchor could be used for multicast traffic, though it's also possible to map multicast groups to anchors such that the load due to multicast traffic is distributed among all the anchors. Every mesh member node in system 101 may be included in the broadcast domain with anchors 130 and 140 sharing a common broadcast domain. In cases such as system 101, only the first anchor node to become active will be responsible for forwarding broadcast traffic from the mesh WLAN to the wired LAN. Mesh member nodes such as node 141 can determine (based on their topology database) that they should flood a frame toward the tree rooted at anchor 130. In the event that a mesh WLAN is partitioned into two or more pieces, the lowest anchor identifier is the one that will serve as the broadcast ingress/egress point.

In addition to mesh identifiers and anchor identifiers, one or more anchors or mesh member nodes within system 101 may also be associated with a particular group and share a group identifier using the Generic Attribute Registration Protocol (GARP) multicast registration protocol (GMRP) of IEEE 802.1D. Multicast group membership information may also be gleaned from "snooping" on internet group management protocol (IGMP) or multicast listener discovery protocol (MLD) traffic. Once determined, group membership information may also be included in the topology database. Per-group-identifier multicast trees may be used to efficiently transmit frames to members of a group. For example, a multicast tree may include station 132 and mesh member nodes 142, and 133.

Figure 1C:
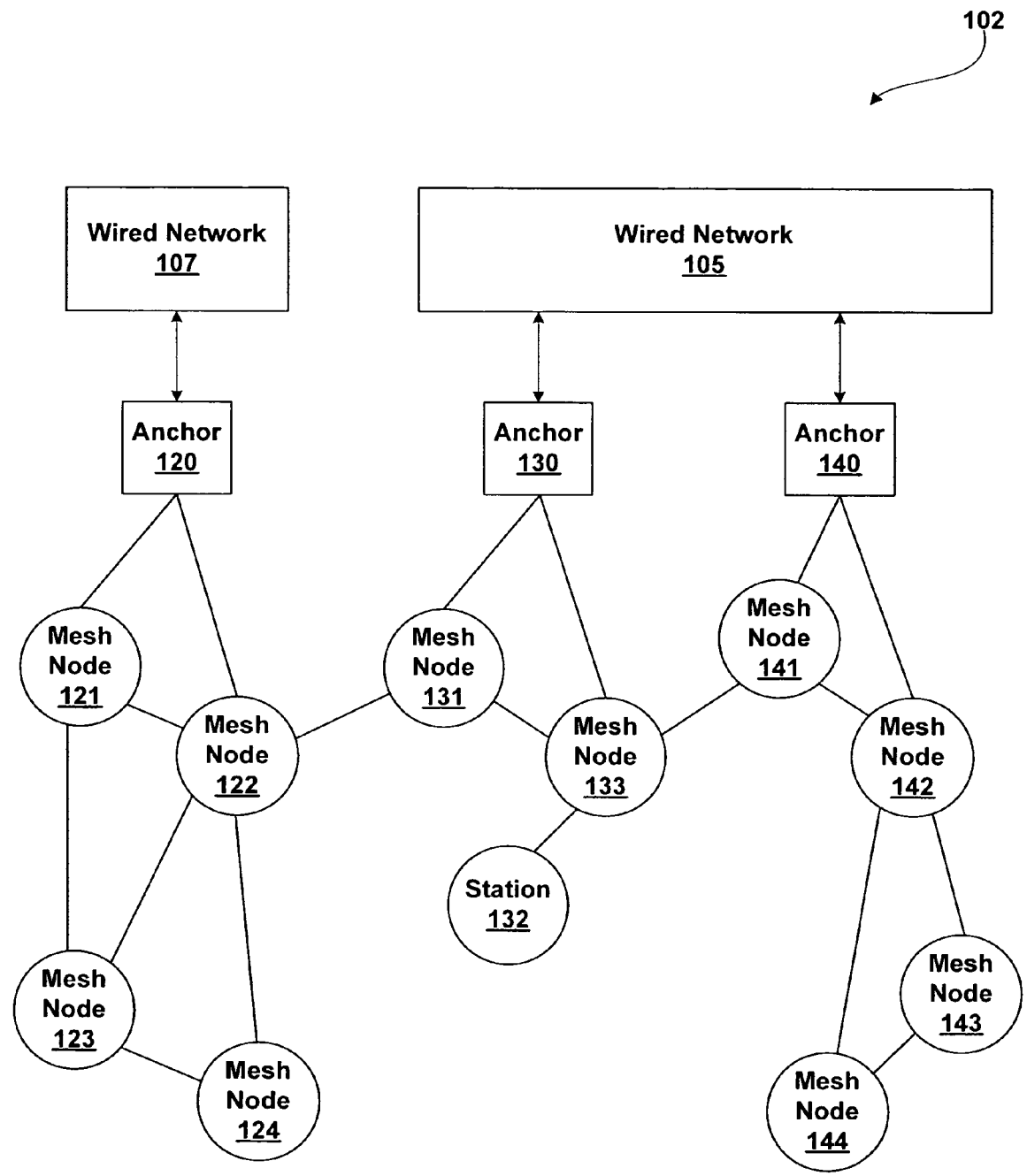

FIG. 1C is an illustration of a self-configuring mesh networking system, system 102, in accordance with one or more aspects of the present invention. System 102 includes anchors 130 and 140 and mesh nodes 141, 142, 143, 144, 131, 133, and station 132 of FIG. 1B. System 102 also includes additional wireless mesh clients self-configured as mesh-aware access points, specifically anchor 120 and mesh member nodes 121, 122, 123, and 124. Anchor 120 is coupled to wired network 107. Therefore anchor 120 and anchor 130 are not neighbors. However, mesh modes 122 and 131 provide a path between the anchor tree of anchor 120 and the anchor tree of anchor 130 and may share a common mesh identifier.

To form system 100, 101, or 102, at least two access points operate in a coordinated fashion to share mesh topology information and mesh network information for efficient sharing of the wireless bandwidth. To avoid communication conflicts within system 100, 101, or 102, while simultaneously reducing delays and message buffering, wireless mesh members within system 100, 101, or 102 may use multiple radio channels for communication. Therefore, mesh network information including various attributes, such as distance, the number of message hops, link bandwidths, available frequencies, antenna gain, antenna directivity, signal noise, signal-to-noise ratios, available transmit power, the number of recent retransmissions, RSSI, radio channel bandwidths, radio channel selectivity, weighted error rates, weighted signal strengths, and the like, may be shared between mesh member nodes and used to determine efficient routing paths, as described below in conjunction with FIGS. 5A, 5B, and 5C. The mesh information may be stored in each mesh member node's topology database for use during path selection.

Wireless local area networks (LAN) are often based on IEEE 802.11 standard protocols. Because those protocols are well-known, are widely supported by existing products and suppliers, and have generally proven successful, it is desirable to use mechanisms compatible with existing IEEE 802.11 protocols to communicate between wireless mesh members within system 100, 101, or 102. Furthermore, using such mechanisms permits non-mesh enabled wireless stations to communicate via system 100. IEEE 802.11 compatible mechanisms enable wireless mesh members to leave and to join system 100, 101, or 102 and efficiently communicate mesh topology information and specific mesh member node information. Non-mesh-member nodes typically connect to the closest access point (which they determine based on signal strength) and these stations see the mesh node to which they attach as a conventional access point in every way.

Figure 3:
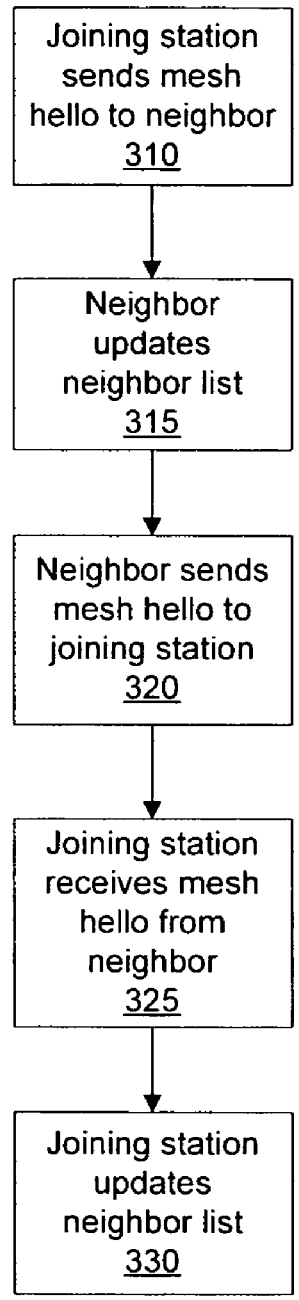
FIG. 3 is an embodiment of a method for a wireless station to join a self-configuring mesh in accordance with one or more aspects of the present invention.
Figure 4A:
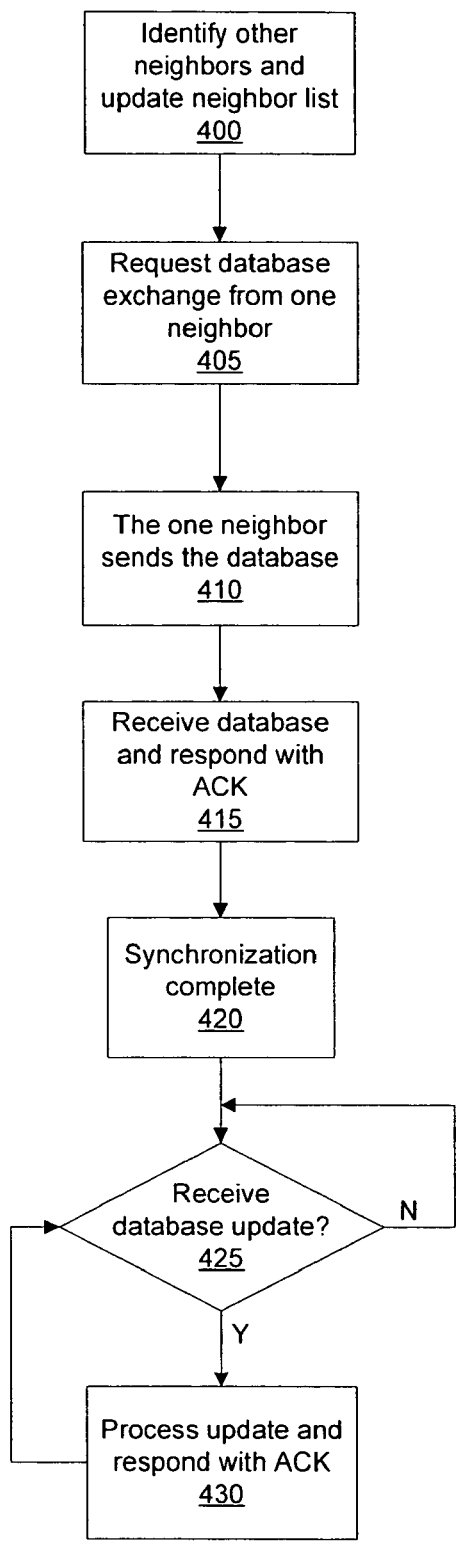
FIG. 4A illustrates an embodiment of a method for a wireless station to exchange a database within a self-configuring mesh in accordance with one or more aspects of the present invention.

Auto-discovery performed each mesh member node results in an awareness of the self-configuring wireless mesh network topology through meshHellos and topology database exchanges, as described in conjunction with FIGS. 3 and 4A. Each mesh member node may then use the standardized 4 address MAC header format to transmit messages efficiently within the self-configuring wireless mesh network (messages between mesh member nodes and their attached stations will use the common 3 address frame format).

Joining a Self-Configuring Mesh

Figure 2:
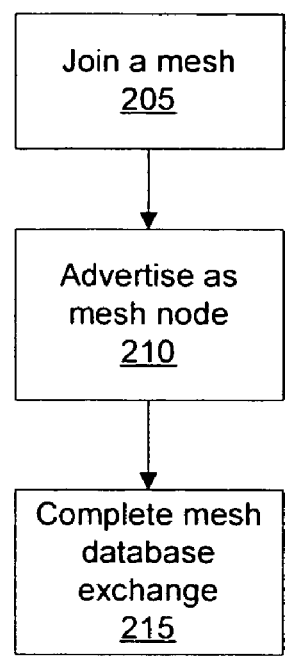
FIG. 2 is an embodiment of a method for a wireless station to join a self-configuring mesh and become a mesh node in accordance with one or more aspects of the present invention.

FIG. 2 is an embodiment of a method that a wireless client may implement to join a self-configuring mesh and become a mesh member node, in accordance with one or more aspects of the present invention. Before starting step 205 shown in FIG. 2, the wireless client performs standard initialization of the physical layer (the "PHY") and the medium access control sublayer (the "MAC") of the wireless client and authentication using techniques specified by the IEEE 802.11i standard.

The potential mesh member node must discover whether or not it is near an existing mesh before it can decide to join it. Another possibility is that the potential mesh member node is near a legacy access point, and the new mesh member node elects to start a new mesh, thereby extending the range of the existing wireless LAN. In step 205 the wireless client joins the mesh, as described in conjunction with FIG. 3 and becomes a station, such as station 132. In step 210 the station becomes a mesh member node and advertises itself as such, thereby permitting other stations to join the mesh by connecting to it. In step 215 the station completes a mesh database exchange, as described in conjunction with FIG. 4A, synchronizing its own database to reflect the current mesh topology and specific mesh member node information. Note that if this new mesh member node is the first member node in this mesh, there will be no topology database exchange; the node will simply track all the topology information it knows, and will share it with future mesh member nodes that attach to it. Persons skilled in the art will appreciate that any system configured to perform the method steps of FIG. 2 or its equivalent, is within the scope of the present invention.

FIG. 3 is an embodiment of a method that a wireless client, such as station 132 may implement, to join a self-configuring mesh, such as system 100, 101, or 102, in accordance with one or more aspects of the present invention. In step 310 a joining station multicasts a meshHello message to determine if any mesh nodes are nearby. For example, station 132's meshHello message may be heard by mesh node 133. The meshHello message includes a neighbor list specifying neighbors of the joining station that are on the same channel as the joining station (they will not all necessarily be in range of the joining station). Because the joining station is not yet part of the self-configuring mesh, the neighbor list is initially empty. When the joining station has completed the mesh joining process, it will advertise (in its meshHello packets) which mesh nodes it can hear.

In some embodiments of the present invention, a MAC protocol used by system 100, 101, or 102 includes a specific hello message, a meshHello, which is sent on a reserved multicast address. Alternatively, the meshHello is sent using a management frame with a particular management frame subtype that is common to all mesh management packets within system 100, 101, or 102. In other embodiments of the present invention, the MAC protocol used by system 100, 101, or 102 includes the meshHello information within an IEEE 802.11 Beacon frame. Unlike multicast messages, messages sent using the reserved multicast address are not forwarded by mesh member nodes. Similarly, messages sent using the beacon have the property already that they are not forwarded by either mesh member nodes or by other access points neighboring the joining station, even access points which are not mesh-enabled and are therefore not mesh-aware. Existing IEEE 802.11 protocols provide for management frames and beacons, and those concepts are applicable to self-configuring mesh networks.

The contents of the meshHello are conveyed with a digital signature that verifies the authenticity of the message. For example, a hash may be computed as the digital signature using the MAC address, a version number, several addresses in the message header (the MAC source address and the MAC destination addresses), a timestamp, and the meshHello packet body (or information element body), as well as a key that only is known to members of the mesh. The computed hash is then sent as part of the meshHello message. In some embodiments of the present invention the digital signature is an IEEE 802.11i unicast signing key and messages are encrypted with an IEEE 802.11i group encryption key.

In step 315 the neighbor receives the meshHello and updates its neighbor list to include the joining station. Every mesh node, such as the neighbor, stores and maintains a neighbor list including all of the other mesh member nodes that are adjacent to the mesh member node (by adjacent, we mean other mesh member nodes on the same channel that are within range of the receiving mesh member node). The neighbor list is included in each mesh member node's topology database. In step 320 the neighbor sends a meshHello message to the joining station. The meshHello message includes the neighbor's own neighbor list which specifies the joining station as a neighbor. Mesh member nodes, such as mesh member nodes 121, 122, 123, 124, 131, 133, 141, 142, 143, and 144, send meshHellos on all active channels frequently enough so that adjacent mesh clients (mesh member nodes and joining stations) on all channels are detected. Neighboring mesh member nodes are included in a neighbor list for both wired and wireless connections. Therefore, neighboring anchor points are also included in a neighbor list of a mesh member node or an anchor neighboring an anchor. For example, anchor 130 has a neighbor list including anchor 120, mesh node 131, and mesh node 133. Specifically, anchor mesh member nodes send meshHellos over wired network 105 to discover neighboring anchor mesh member nodes that are part of the system 100, 101, or 102. The first node in the mesh establishes the ESSID as defined by the network manager (or the manufacturer's default ESSID).

In step 325 the joining station receives the meshHello sent by the neighbor, and two-way connectivity is established. When two-way connectivity cannot be established, the joining station does not become a neighbor of the mesh member node which received the meshHello sent in step 310. The station may then attempt to join the mesh via another mesh member node that is in range of this station.

In step 330 the joining station updates its neighbor list by adding the neighbor. Once the joining station has established two-way connectivity with a mesh member node, it may proceed to complete the steps described in conjunction with FIG. 4A to become a candidate mesh member node. Persons skilled in the art will appreciate that any system configured to perform the method steps of FIG. 3 or its equivalent, is within the scope of the present invention.

Additional wireless stations can join a self-configuring mesh network, such as system 100, 101, or 102, by completing steps 310, 315, 320, 325, 330, and 335. It should be noted that a wireless station can join the self-configuring mesh network by connecting to any mesh member node or anchor. The neighbor list for a particular mesh member node that is included in each meshHello lists all of the authenticated mesh member nodes (mesh member nodes, stations, and anchors) that have successfully established themselves as adjacent neighbors of the particular mesh. Once a wireless station joins a self-configuring mesh network, it becomes associated with exactly one anchor. For example, a joining station, such as mesh node 131 may choose to associate with either anchor 120 or 130.

Topology Representation

As previously described, each mesh member node stores a database representing the topology of the self-configuring network, such as system 100, 101, or 102. This topology database may be represented as a topology database, or any other structure that is capable of representing the topology such that it is efficient to perform path selection based on the contents of the database. Auto-discovery of mesh member node neighbors and awareness of the wireless mesh network topology by each mesh member node enables efficient message routing within the self-configuring wireless mesh network. Any mesh member node which lacks resources to store the entire topology database, such as an older mesh member node, i.e., legacy station, may store a subset of the topology database (or in the most extreme case, it could simply pick a neighbor and send all traffic it receives for which it is not directly connected to the recipient to that selected upstream neighbor). As alluded to here, any subset will include at least one neighboring mesh member node which is used to provide a "default" routing path for communication beyond this low-end mesh member node. The low-end mesh member node also maintains a list of associated stations for routing local station-to-station frames. In any case, the low-end mesh member node must still participate in the flooding of topology information, since it must be possible for other mesh member nodes to determine that this low-end node is an intermediate node on the path to some other node.

In addition to representing the topology of the mesh member nodes, the topology database includes the MAC addresses of the stations connected to each mesh member node. For example, the MAC address of station 132 is specified in the topology database as being coupled to mesh node 133. Anchor mesh member nodes are specifically identified using a flag or other mechanism. Capabilities of each mesh member node may also be included in the topology database. The topology database represents a mesh as a tree with branches between the mesh member nodes and with the border mesh member nodes, e.g., anchors 120, 130, and 140, forming a trunk connected to a wired network, such as wired network 105. Stations, such as station 132 are endpoints of the mesh network, represented as leaves of the mesh tree. In some embodiments of the present invention some mesh members and their supported meta-data (which is inserted into the topology database) are proprietary to a particular vendor. Therefore, the database namespace for each mesh object should be large enough to allow for partitioning between proprietary and standard mesh objects.

Each mesh member node maintains neighbor information which may be included in the topology database. For example, the neighbor information may specify whether a neighbor is reachable via a wired or wireless link and any associations with an anchor identifier, group identifier, or mesh identifier. In addition to topology information, the topology database and updates to the topology database may include advanced data objects, specifically mesh network information, e.g., attributes and metrics, for making path selection decisions. Mesh network attributes are measured by mesh member nodes such as distance, the number of message hops, link bandwidths, available frequencies, antenna gain, antenna directivity, signal noise, signal-to-noise ratios, available transmit power, the number of recent retransmissions, RSSI, radio channel bandwidths, radio channel selectivity, and the like. Mesh member node metrics are computed by mesh member nodes and may include RSSI variability, weighted signal-to-noise ratios, weighted utilization, a number of alternate paths through a given mesh member node, frame error rates, inter-mesh member node link speed, weighted error rates, weighted signal strengths, and the like.

Mesh member nodes may dynamically compute specific metrics such as per-channel link utilization and quality (e.g., per-neighbor RSSI averaged over recent frames), and use these metrics to determine routing paths to a given destination MAC address. Furthermore, some mesh member node meta-data may be vendor-specific. Different vendors may want to track parameters for various combinations of the mesh member nodes and use vendor specific attributes and/or metrics, in addition to more metrics recommended by standards or vendor consortia, to select optimal paths within the self-configuring mesh network.

Communicating Mesh Network Database Information

FIG. 4A illustrates an embodiment of a method that a wireless station, such as station 132, may implement to exchange a database within a self-configuring mesh, such as system 100, 101, or 102, in accordance with one or more aspects of the present invention. Once a joining station establishes that two-way connectivity exists with a neighboring mesh member node, in step 400 the joining station may proceed to discover any additional neighboring mesh member nodes. The method used to discover additional neighboring mesh member nodes is the same method that is used to join the mesh network. MeshHello messages including the joining station's neighbor list are received by any other neighboring mesh member nodes, and the joining station is added to each of the neighboring mesh member nodes' neighbor lists. Each of the additional neighboring mesh member nodes sends a meshHello to the joining station and two-way communication is established. The joining station's neighbor list is then updated to include all of its adjacent neighbors. Mesh member nodes may send meshHellos on all active channels as frequently as necessary such that it is easy to establish their continued presence, such that neighbors on all channels are detected and that the frequency space can be used to allocate the available bandwidth.

In step 405 the joining station initiates a database exchange with one of its neighboring mesh member nodes. The database exchange is initiated by sending a database exchange request to the selected neighboring mesh member node. The database exchange can also be triggered implicitly by including a database version number in the neighbor establishment exchange. If the neighbor notices that the new neighbor has no database, or an out-of-date database, then the new neighbor can immediately begin transferring a new database, or an updated database, to this neighbor.

The version number is incremented each time the topology database is updated to reflect a change in the topology of the self-configuring mesh network. For example, the topology database is updated when a mesh member node disconnects from a formerly adjacent mesh member node as it moves within the self-configuring mesh network. The topology database is also updated if, and when, the mesh member node connects to another mesh member node. Strictly, the node is no longer a member if it loses all of its connections to adjacent mesh member nodes. In some embodiments of the present invention, mesh member nodes may power down to conserve power, thereby disconnecting from neighboring mesh member nodes, resulting in topology database updates. An optimization may allow a node to power down if it knows that it is not the only path between two parts of the mesh. Any node that is in a critical path would not be allowed to power down. It would be possible, however, for a mesh member node that was on a redundant path to mark itself as "dozing", which would allow other mesh member nodes to avoid selecting paths to a destination that include this dozing node.

In step 410 the one selected neighboring mesh member node receives the implicit or explicit request from the joining station and then sends the topology database to the joining station in return. The one selected neighboring mesh member node includes the version number, timestamp, sequence number, or other version identifier with the topology database. In step 415 the joining station receives the topology database and responds to the one selected neighboring mesh member node with an acknowledgement message (ACK) including the version identifier.

In step 420 the topology database of the joining station is synchronized with the one selected mesh member node and the version identifier of the topology database received in step 415 becomes the current database version identifier for the joining station. The current database version is the most recent that the selected neighboring mesh member node has received or generated. During the time between when the one selected neighboring mesh member node sent the topology database and the acknowledgement message is received, the one selected neighboring mesh member node may have received a topology database update from one of its neighbors. If so, then the version identifier will have changed and the topology database update will need to be sent to the joining station to complete the database synchronization.

After completing step 420, the joining station which was a candidate mesh member node may function as a mesh member node. Specifically, the new mesh member node may begin responding to requests for association received from other joining stations. The topology database version number is also included in all meshHello packets. Therefore, an out-of-date mesh member node, i.e., a mesh member node whose topology database version number predates the topology database version number received in a meshHello packet, can request a topology database update.

In step 425 the joining station which has become a new mesh member node determines if a topology database update is received, and, if so, in step 430 the new mesh member node processes the topology database update and responds with an acknowledgement message including the version identifier.

Once a new mesh member node is synchronized with a neighboring mesh member node using the technique described in conjunction with FIG. 4A, the mesh member node may generate or receive topology database updates. A topology database update is triggered by a topology change or a change in an advanced data object that is stored in the topology database. Topology database updates are flooded reliably by the member mesh member nodes to each mesh member node within an anchor tree. Synchronization of the entire mesh network converges quickly because the topology database updates are unicast to each adjacent neighbor mesh member node to reach multiple neighbors essentially simultaneously. The topology database updates are also ACKed for reliability, as described in conjunction with FIG. 4C. A separate output queue is maintained by each mesh member node for each of its neighbors. Whenever a neighbor does not ACK a topology database update, the mesh member node will retransmit that update. If the retransmissions go on for too long, the mesh member node may declare that it is no longer a neighbor of that other node.

FIG. 4B illustrates an embodiment of a method that a mesh member node may implement to initiate a topology database update in accordance with one or more aspects of the present invention. In step 440 a mesh member node detects a change in the mesh topology or in a mesh network attribute or metric which it has injected into the topology database. For example, a mesh topology change is detected when station 132 moves away from mesh node 133, and mesh node 133 fails to receive three consecutive meshHello frames (the threshold for missed frames is arbitrary and needs to be set to a value which is small enough to allow the neighbor to react quickly when a neighbor has moved away, but long enough so that the occasional lost packet doesn't make a mesh member node think that a neighbor has disappeared. In such as situation, mesh node 133 removes station 132 from its neighbor list. While moving away from mesh node 133, station 132 may move within range of mesh node 131 and rejoin the self-configuring mesh network by connecting to mesh node 131. Mesh node 133 and mesh node 131 would each detect a change necessitating a topology database update, as previously described herein.

In addition to topology information topology database updates may include advanced data objects, specifically mesh network information. Just as topology database updates are generated by a mesh member node when a topology change is detected, a topology database update may be generated when a change in mesh network information is detected. As previously described, mesh member nodes may dynamically compute specific metrics and use these metrics to determine routing paths. Older mesh member nodes may not store advanced data objects, but are configured to transmit topology database updates including those which included updates for advanced data objects. It is also possible that some mesh member nodes may have the resources to store non-standard meta-data, but that they will not understand it. Such behavior facilitates passing the meta-data to other nodes which may join the mesh later, and which may actually be able to understand the meaning of this meta-data.

In step 445 the mesh member node detecting the change in step 440 sends a topology database update to its neighbors. The topology database update may be transmitted using truncated reverse-path broadcasting or any other suitable flooding algorithm. Reliability is provided by the hop-wise acknowledgements and per-neighbor update queues (to allow multiple updates for a given neighbor to be delivered in-order). In some embodiments of the present invention, the topology database updates may use a reserved multicast address. For example, after detecting station 132 is disconnected, mesh node 133 sends a topology database update indicating that it is no longer connected to station 132. Likewise, mesh node 131 sends a topology database update indicating that station 132 has joined the mesh and is a neighbor of mesh node 131. Any in-flight frames destined for station 132 are buffered by mesh node 133 until mesh node 133 receives the topology database update sent by mesh node 131. If station 132 is unable to stay in the mesh and becomes unreachable, the in-flight frames are not buffered. After updating its topology database and neighbor list to indicate station 132 is a neighbor of mesh node 131, mesh node 133 will forward the traffic for station 132 to mesh node 131.

In another example, mesh node 131 moves out of range of anchor 130 and mesh node 133 while maintaining its connection to mesh node 122. In this example, mesh node 133 and anchor 130 would each generate topology database updates indicating that mesh node 131 is no longer a neighbor. Mesh node 122 may also generate a topology database update indicating that mesh node 131 is a member of the tree associated with anchor 120 instead of the tree associated with anchor 130. When a topology database update is received by a mesh member node, the topology database is unicast to each adjacent neighbor mesh member node within an anchor tree. Each mesh member node ACKs topology database updates it has received to ensure reliability. A mesh member node only updates its own topology database to reflect received topology database updates after verifying that any neighboring mesh member nodes have received the topology database updates as described in conjunction with FIG. 4C.

FIG. 4C illustrates an embodiment of a method that a mesh member node may implement to process a topology database update, in accordance with one or more aspects of the present invention. In step 450 a mesh member node which generated and sent a topology database update receives a topology database update ACK. The mesh member node maintains an output queue for each neighbor and when a topology database update is generated it is placed in each queue. As previously described, the topology database update includes a version identifier. After receiving and processing the topology database update, each neighbor sends an ACK including the version identifier received with the topology database update. In step 453 the mesh member node floods the topology database update ACK received in step 450 to all of its neighbors. In step 455 the mesh member node determines if the version identifier in the ACK matches the current database version. If the mesh member node has received an intervening topology database update from a neighboring mesh member node or has generated another topology database update, the current version will not match the version identifier in the ACK.

If, in step 455 the mesh member node determines that the version identifier in the ACK does not match the current database version, then in step 465 the mesh member node waits for another database update ACK to arrive before returning to step 450. If, in step 455 the mesh member node determines that the version identifier in the ACK does match the current database version, then in step 460 the mesh member node determines if all of the neighbors are synchronized, i.e., if each neighbor has acknowledged receiving the topology database update and is using the current database version. If, in step 460 the mesh member node determines that all of the neighbors are not synchronized, then in step 465 the mesh member node waits for another database update ACK to arrive before returning to step 450.

If, in step 460 the mesh member node determines that all of the neighbors are synchronized, then in step 470 the mesh member node updates its own topology database to the current version. Therefore, the mesh member node updates it own topology database and neighbor list after synchronizing with its neighbors. In step 475 the mesh member node updates path selection information based on the updated topology database. For example, when a particular mesh member node disconnects or moves within the mesh, the path selection information may be recomputed to determine the optimal path to use to reach the particular mesh member node. When advanced data objects are used, the path selection information may also be updated when a topology database update includes mesh network information. Persons skilled in the art will appreciate that any system configured to perform the method steps of FIG. 4A, 4B, or 4C or their equivalents, is within the scope of the present invention.

In a self-configuring mesh network, such as system 100, 101, or 102, topology database updates are flooded as soon as possible. Topology database updates may use a reserved multicast address that is different than the one used for meshHellos. In some embodiments of the present invention, topology database updates do not include the database change, but instead signal neighboring mesh member nodes to retrieve the modifications of the topology database from the originating mesh member node. In still other embodiments of the present invention, each mesh member node may include its current database version in meshHello messages that it sends and mesh member nodes can determine that their database version is not synchronized with a neighboring mesh member node. A mesh member node with non-current database version may then request a database update from a neighbor using the current database in order to synchronize its topology database.

Determining Routing Paths

Path selection decisions for forwarding messages are made locally by each mesh member node and are therefore decoupled from topology discovery. A decision of how to forward a received message is based on the destination MAC address of the mesh member node and the topology database stored by the mesh member node, including the mesh topology and mesh network information. Since MAC addresses are a flat address space, each endpoint address in the mesh is individually represented in the mesh member node's "routing table", and the mesh member node may determine the best path to the frame's destination MAC address. This allows the possibility that a mesh member node may be accessed through different mesh member nodes and a path to the mesh member node may be selected using mesh network information stored as advanced data objects in the synchronized topology database. For example, attributes and metrics such as noise, utilization, error rates, signal strength, retransmission rates, and the like may be used to select one path when two or more paths are available. Otherwise, the topologically shortest path would be chosen. Persons skilled in the art will appreciate that any number of metrics could be chosen as a basic "length" measure, for example fastest path-wise link speed, the path with the highest cumulative signal strength, the number of hops, etc.

Figure 5A:
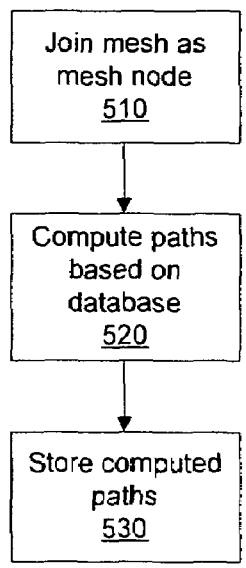
FIG. 5A illustrates an embodiment of a method for determining a path within a self-configuring mesh system in accordance with one or more aspects of the present invention.

FIG. 5A illustrates an embodiment of a method that a mesh member node may implement to determine a path within a self-configuring mesh system, such as system 100, 101, or 102, in accordance with one or more aspects of the present invention. In step 510 a mesh capable station joins the mesh as a new mesh member node and stores a synchronized topology database. In step 520 the new mesh member node computes the paths between each of the mesh member nodes in the self-configuring mesh based on the information in its stored topology database. The paths may be computed based on mesh member node attributes and/or metrics stored in the topology database as advanced data objects. In step 530 the new mesh member node stores the computed path information. The stored path information is used by the new mesh member node as long as the new mesh member node is a member of the self-configuring mesh network. An advantage of this method is that the path information is only computed once; however, the stored path information will not reflect any subsequent topological changes in the self-configuring mesh system, so the paths may be obsolete and/or non-optimal.

In some embodiments of the present invention, a mesh member node uses database objects that it recognizes (attributes or metrics) to compute "shortest path" trees using the Dijkstra algorithm. Each mesh member node stores a routing table listing some or all of the known station MAC addresses that may be reached within the mesh network. The table also includes the neighbor mesh member node that is the next-hop toward the station or mesh member node associated with the MAC address. Any frames with unrecognized MAC addresses are forwarded across the broadcast tree or to a default mesh member node. Mesh networks with multiple exit points, e.g., anchors, such as system 100, 101, or 102, may use per-anchor trees to load-balance traffic. An implicit form of load balancing may be achieved by computing paths only within each anchor tree. IEEE 802.1D (GRMP) and multicast tree building as in multicast extensions to OSPF may be used to form multicast trees. Using anchor trees and multicast trees to transmit message more efficiently makes better use of the available system bandwidth.

Figure 5B:
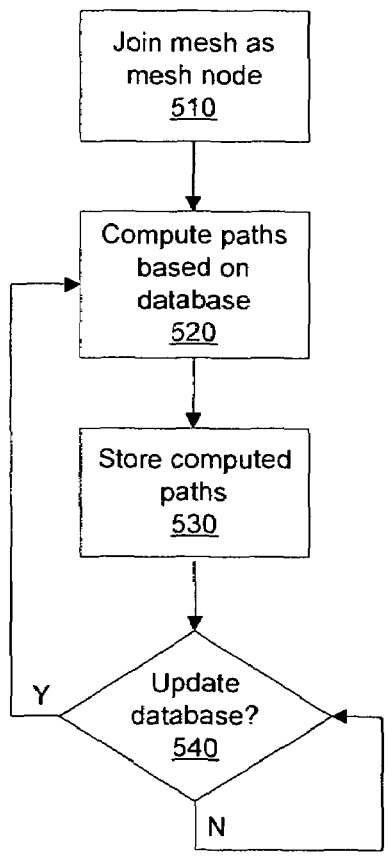
FIG. 5B illustrates an embodiment of a method of selecting a path within a self-configuring mesh system in accordance with one or more aspects of the present invention.

FIG. 5B illustrates an embodiment of another method that a mesh member node may implement to select a path within a self-configuring mesh system, such as system 100, 101, or 102, in accordance with one or more aspects of the present invention. Steps 510, 520, and 530 are completed as previously described above in conjunction with FIG. 5A. In step 540 the new mesh member node determines if its topology database has been updated due to receiving or generating a topology database update. If its topology database has been updated, then step 520 is repeated and the path information is recomputed based on the updated topology database. If, in step 540 the topology database has not been updated, then the new mesh member node continues to use the existing path information to select paths within the self-configuring mesh system. In some embodiments of the present invention, the path information may be recomputed only when the topology database is updated to reflect a topology change. In other embodiments of the present invention, the path information may be recomputed when the topology database is updated to reflect a network information change. In still other embodiments of the present invention, the path information for a particular destination may be computed when a frame is received for that destination and there isn't an entry for the particular destination in the routing table.

Figure 5C:
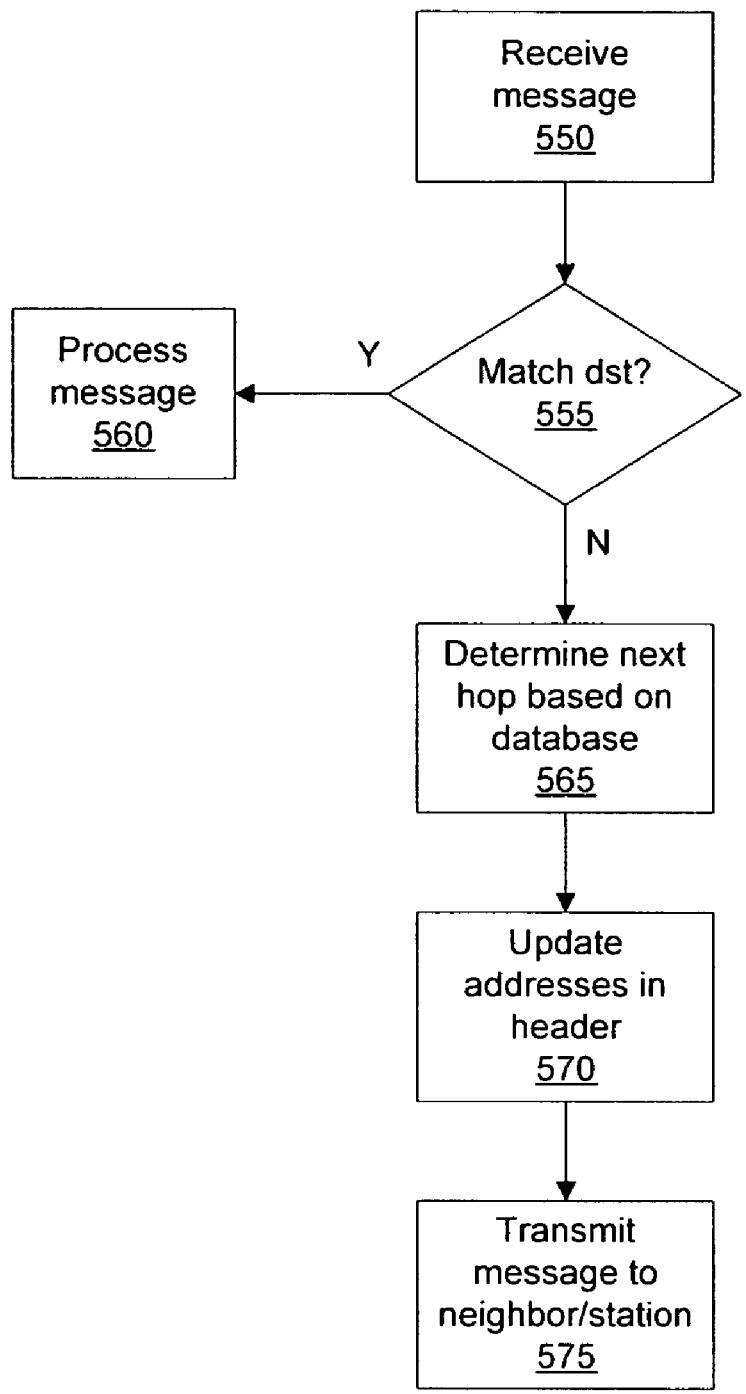
FIG. 5C illustrates an embodiment of another method of selecting a path within a self-configuring mesh system in accordance with one or more aspects of the present invention.

FIG. 5C illustrates an embodiment of yet another method of that a mesh member node may implement to select a path within a self-configuring mesh system, such as system 100, 101, or 102, in accordance with one or more aspects of the present invention. Unlike the methods described in conjunction with FIGS. 5A and 5B, this method does not require storing computed path information. In step 550 a mesh member node receives a message and identifies the destination MAC address included in the message header.

The IEEE 802.11 standard specifies up to four address fields within the MAC frame header of a data-type message, a destination address, a source address, a receiver address, and a transmitter address. The source and destination addresses are the MAC addresses of the source and destination mesh member node, station, or clients of a wired network, and they do not change during transmission of the message. The receiver address is the MAC address of the next-hop mesh member node. The transmitter address is not used in conventional (i.e., non-mesh) wireless networks, however, in some embodiments of the present invention, the transmitter address is the MAC address of the mesh member node that the message is received from. When a message is transmitted from a first mesh member node to a second mesh member node, the receiver address becomes the transmitter address so that when the second mesh member node transmits the message the second mesh member node MAC address is in the transmitter address field. Those skilled in the art will recognize that the four address fields may be used in conjunction with the path determination methods described in conjunction with FIGS. 5A and 5B, however the only address that gets looked up in each mesh member node is the destination address; the appropriate next-hop receiver address is extracted from the routing table lookup, and will always be one of the mesh member node's immediate neighbors.

In step 555 the mesh member node determines if the destination address matches the MAC address of the mesh member node itself, and, if so, the mesh member node processes and ACKs the message. If, in step 555 the mesh member node determines that the destination address does not match the MAC address of the mesh member node, then in step 565 the mesh member node uses its synchronized topology database to determine a path for delivery of the message to the destination MAC address. The path may be determined based on any combination of topological data or advanced data objects stored in the topology database. The path selection is determined "on-the-fly" using the topology database stored in each mesh member node rather than using pre-computed path information.

In step 570 the mesh member node places its own MAC address in the transmitter address field of the message header and places MAC address of the next-hop, i.e., the neighboring mesh member node along the computed path towards or directly to the destination mesh member node or station, into the receiver address field of the message header. When the MAC address of the next-hop is the destination address, the BSSID of the mesh member node may be placed in the receiver address field. In step 575 the mesh member node transmits the message to the next-hop mesh member node. Persons skilled in the art will appreciate that any system configured to perform the method steps of FIG. 5A, 5B, or 5C or their equivalents, is within the scope of the present invention.

The anchors in a self-configuring wireless mesh network store the topology database including mesh network information and representing the topology of all of the anchors, mesh member nodes, and stations in a system, such as system 100, 101, or 102. Therefore, each anchor is able to determine a path, using a method described in conjunction with FIG. 5A, 5B or 5C, to any mesh member nodes, stations, or other anchors in the system. In some embodiments of the present invention, one or more mesh member nodes within an anchor tree store a portion of the topology database stored by anchors. Specifically, the portion of the topology database includes mesh network information for mesh nodes within the anchor tree and represents the topology of the anchor tree and any neighboring mesh member nodes that are part of another anchor tree.

For example, mesh node 141 may store mesh network information for anchor 140 and mesh nodes 142, 143, and 144 and represent the topology of the anchor tree for anchor 140. Mesh node 141 may also store information associated with neighboring mesh node 133. Unlike mesh node 141, mesh nodes 142, 144, and 143, which are not neighbor mesh member nodes of mesh node 133, do not necessarily store information associated with neighboring mesh node 133. As the number of member mesh nodes within a system, such as system 100, 101, or 102 increases, relying on anchors to store the topology database and storing only per-anchor portions of the topology database in each member mesh node allows for greater scalability of the self-configuring wireless mesh network while efficiently using the available wireless bandwidth. Member mesh nodes need not store the entire topology database in order to perform path selection and route messages through the self-configuring wireless mesh network.

An Exemplary Self-Configuring Mesh Client

Figure 6:
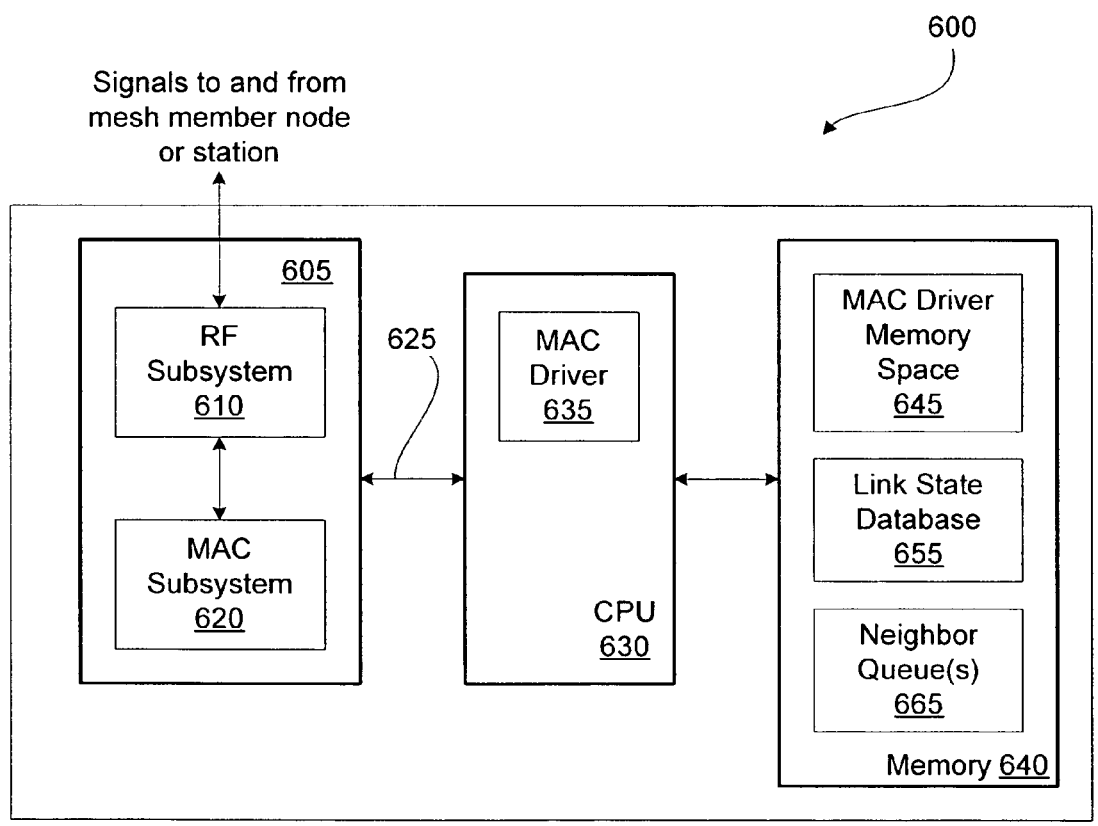
FIG. 6 is a conceptual diagram of a computing device that may be configured as a mesh client in accordance with one or more aspects of the present invention.

FIG. 6 is a conceptual diagram of a computing device 600 that may be configured to implement the method steps of FIGS. 2, 3, 4A, 4B, 4C, 5A, 5B, and 5C, according to one embodiment of the invention. Computing device 600 may be any type of wireless computing device configured as a mesh member node or station, such as, for example, a desktop computer, a laptop computer, a personal digital assistant or a cellular phone. As shown, computing device 600 includes, without limitation, a radio frequency (RF) subsystem 610, a MAC subsystem 620, a central processing unit (CPU) 630 and a memory 640. RF subsystem 610 and MAC subsystem 620 are well known in the art, specifications for which are set forth in the IEEE 802.11 standard. A MAC driver 635 runs on CPU 630 (and within driver memory space 645 of memory 640). CPU 630 is coupled to a networking element 605, which includes RF subsystem 610 and MAC subsystem 620, via input/output bus 625. In alternative embodiments, methods described herein may be implemented using a processor other than CPU 630, such as a dedicated networking processor, a graphics processor, some other type of special-purpose processor, or a hardware state machine with special-purpose logic dedicated to implementing this functionality.

RF subsystem 610 is configured to measure the RSSI and the signal-to-noise ratio associated with each frame of a signal received by computing device 600 from a mesh client. RF subsystem 610 is further configured to measure the transmission error rate associated with a corresponding signal transmitted from computing device 600 to a mesh client. In addition, RF subsystem 610 is configured to transmit these measurements as well as the received frames to MAC subsystem 620. Other mesh client attributes may also be measured by RF subsystem 610 and transmitted to MAC subsystem 620. Furthermore, the measured attributes may be used to compute specific metrics, such as RSSI variability, weighted signal-to-noise ratios, weighted utilization, a number of alternate paths through a given mesh member node, frame error rates, inter-mesh node link speed, weighted error rates, weighted signal strengths, and the like. The measured attributes and/or metrics may be used by MAC driver 635 to perform path selection computations.

MAC driver 635, through CPU 630, is configured to interpret these measurements at a set frequency and determine whether or not to generate a topology database update to communicate a mesh network information change. MAC driver 635 may be configured to instruct MAC subsystem 620 to adjust settings in RF subsystem 610. MAC driver 635, through CPU 630, is configured to store the mesh network information as advanced data objects in a topology database 655 in memory 640. MAC driver 635, through CPU 630, is also configured to generate and process meshHello messages. When MAC driver 635 detects a new or dropped neighbor it generates a topology database update. MAC driver 635 also processes topology database updates received from neighboring mesh member nodes, updates topology database 655, and generates acknowledgement messages. The topology database 655 includes topological data maintained by MAC driver 635 based on the meshHello messages, topology database exchanges, and topology database updates. Memory 640 may also include one or more neighbor output queues 665 used to buffer outgoing messages, including topology database updates.

Persons skilled in the art will recognize that computing device 600 may be configured to include other elements to support additional interfaces, such as, without limitation, a PCI bus, a PCI express bus, a system management bus, a universal serial bus or any other industry standard or proprietary bus. Further, the foregoing describes only one system in which the invention may be implemented. In alternative embodiments, the invention may be implemented in any type of computing device or equivalent system containing the components necessary to implement the various functionalities described herein. Persons skilled in the art will therefore understand that the hardware environment depicted in conjunction with computing device 600 in no way limits the scope of the invention.

Contention Free Inter-Mesh Node Transfers

Within a self-configuring mesh network, such as system 100, 101, or 102, station-to-mesh-node traffic flows between stations associated with a particular mesh member node sharing bandwidth with traffic flowing through the particular mesh member node to other mesh member nodes. Inter-mesh node traffic, i.e., traffic that flows between mesh member nodes, competes for bandwidth with traffic entering and leaving the mesh. Lack of a mesh-wide mechanism to reserve time for transfers, such as mesh-wide request to send and clear to send (RTS/CTS) results in the likelihood of collisions becoming a virtual certainty. However, in practice such a mesh-wide mechanism for reserving time will be inefficient because all transactions may be serialized, even transactions in non-overlapping RF regions that could be completed concurrently.

Alternatively, a mesh-wide contention-free period, described further herein, may be used to transfer traffic likely to have a higher collision rate, specifically inter-mesh node traffic. Outside of the contention-free period station-to-mesh-node traffic may be transferred using the distributed coordination function (DCF) specified by the IEEE 802.11 standard. Inter-mesh node traffic may also be transferred outside of the contention-free period relying on DCF to reduce collisions caused by mesh member nodes transmitting at the same time. Transfers within a tree may be completed without many collisions and retransmissions, however as the number of mesh member nodes within a tree increases or as the amount of traffic, including traffic entering and leaving the tree, increases, DCF may not provide adequate performance and a contention-free period may be used to transfer the inter-mesh node traffic.

Figure 7:
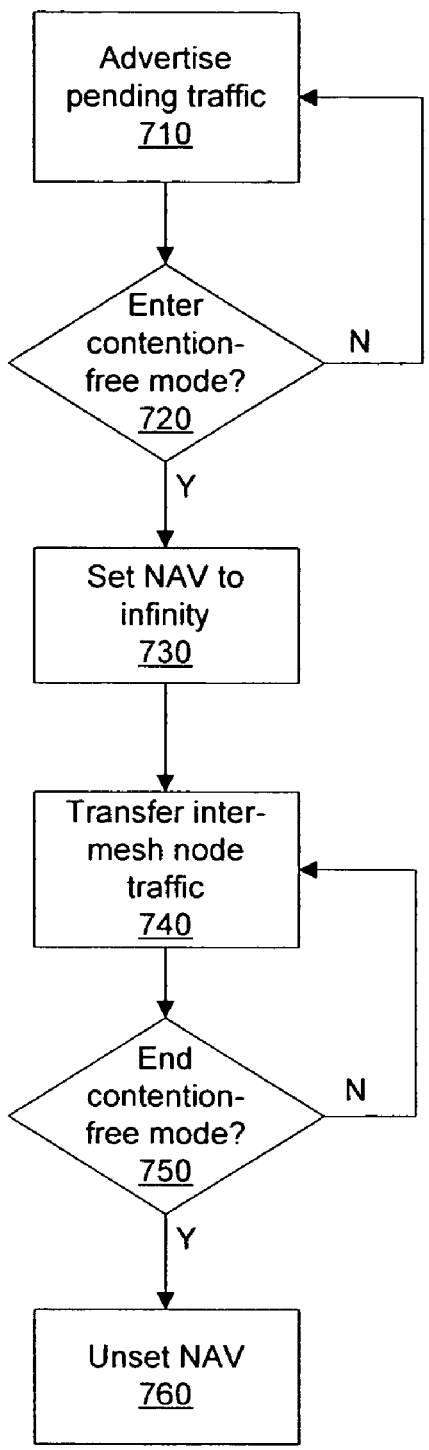
FIG. 7 illustrates an embodiment of a method for transferring inter-mesh node traffic within a self-configuring mesh system in accordance with one or more aspects of the present invention.

FIG. 7 illustrates an embodiment of a method for transferring inter-mesh node traffic within a self-configuring mesh system in accordance with one or more aspects of the present invention. In step 710 a mesh member node advertises whether or not it has pending inter-mesh node traffic queued for output. The mesh member node advertises by sending a topology database update including a flag indicating whether or not it has pending inter-mesh node traffic. The topology database update may also specify how much traffic is queued for output. Each mesh member node updates its respective topology database and is therefore aware of each mesh member node that has pending inter-mesh node traffic and how much pending inter-mesh node traffic is queued in each one of the mesh member nodes. MAC Driver 635 may monitor neighbor queue(s) 665 and generate a topology database update or other management frame to advertise any pending inter-mesh node traffic queued for output. Whether or not it makes sense to populate the queue depth for inter-mesh-node traffic in the topology database has more to do with how frequently the contention-free period repeats, and whether or not the mesh bases the decision to start the contention-free period based on the overall population of those inter-mesh-node queues. It is, by the way, always allowed for a given mesh node to send a frame to another mesh node if the local medium is idle, however a mesh node should always defer to serving its locally attached stations outside of the contention-free period. A mesh member node can terminate the contention-free period in its BSS if it has no further inter-mesh-node traffic to send, and if it can tell that its neighbors also have no further inter-mesh-node traffic to send.

In step 720 the mesh member nodes within the self-configuring mesh system determine if a contention-free mode (CFM) should be entered to begin a contention-free transmit period. Because the topology databases are synchronized, each mesh member node may simultaneously make the same determination. For example, a MAC driver 635 within each of the mesh member nodes may determine to enter the contention-free mode when the amount of traffic queued in any one mesh member node reaches a certain threshold. The threshold may be a programmable value stored in topology database 655 or MAC driver memory space 645. Alternatively, the MAC driver 635 within a mesh member node may only set a flag indicating that it has pending inter-mesh node traffic when a threshold is reached, and the MAC driver 635 may determine to enter the contention-free mode when any one mesh member node's flag stored in topology database 655 is set.

In some embodiments of the present invention, the MAC driver 635 within each of the mesh member nodes may compute an average queue depth and compare that value with a threshold to determine if the contention-free mode will be entered. A variety of possibilities exist for the MAC drivers 635 to use to determine whether or not (or when) the contention-free mode will be entered, including scheduling the contention-free mode using a timer based mechanism to enter the contention-free mode on a periodic basis regardless of whether or not any traffic is queued for inter-mesh node transfer.

If, in step 720, the MAC driver 635 within each of the mesh member nodes determines the contention-free mode should not be entered, the method returns to step 710 and any pending inter-mesh traffic is advertised. If, in step 720, the MAC driver 635 within each of the mesh member nodes determines the contention-free mode should be entered, then in step 730, the MAC drivers 635 each set a network allocation vector (NAV) to infinity, using a mechanism specified by IEEE 802.11. When stations receive the NAV of infinity they recognize that a contention-free mode has been initiated and become quiet, i.e., they do not send any messages of their own. Because stations only need to become quiet, any station that conforms to the IEEE 802.11 standard, even a legacy station, operates properly with mesh-aware mesh nodes which support the contention-free mode. During the contention-free period only a single mesh member node transmits at a time while the other mesh member nodes are able to receive traffic. When multiple mesh member nodes are in range of each other, they may use a round-robin scheme, wherein the highest or lowest MAC address transmits first, and they circulate from there, or any other scheme which allows all of them to drain their inter-mesh-node traffic queues.

In step 740 the MAC driver 635 within each of the mesh member nodes transfers inter-mesh traffic through corresponding MAC subsystems 620 and RF subsystems 610 to drain their neighbor queue(s) 665. A priority for each of the mesh member nodes may be specified and stored in MAC driver memory space 645 or topology database 655 to control the order for processing the neighbor queue(s) 665. For example, a first mesh member node with the highest MAC address may have control of the self-configuring mesh network first, transferring its traffic for a predetermined length of time, reducing the pending number of transactions to fall below a threshold, completing all queued transfers, or the like. Control passes from the first mesh member node to a second mesh member node having the next sequential MAC address, and the process continues until all of the mesh member nodes have had control of the self-configuring mesh network or until the MAC drivers 635 determine that the maximum contention-free period duration has expired. The time duration may be fixed or programmable, and may be variable from one contention-free period to the next. It may be possible to estimate the optimal length of the contention-free period based on the worst-case queue depth across the mesh.

In another embodiment of the present invention, a master mesh member node within each BSS of the mesh may have control of the self-configuring mesh network and the MAC driver 635 within the master mesh member node may allocate portions of the contention-free transmit period to one or more of the other mesh member nodes to drain their neighbor queue(s) 665. For example, the point coordination function (PCF) (also specified by the IEEE 802.11 standard), may be used such that the master mesh member node is designated as a point coordinator. The master mesh member node MAC driver 635 polls the mesh member nodes within the self-configuring mesh network to determine which mesh member nodes have pending traffic and controls which one mesh member node is transferring traffic. The point coordinator therefore ensures that there are no collisions during the contention-free period.

In step 750 the MAC driver 635 within each of the mesh member nodes (or the master mesh member node MAC driver 635) determines if the contention-free mode should end, and, if not, then the method returns to step 740 and the contention-free transmit period continues. The MAC driver 635 within each of the mesh member nodes may estimate the duration of the contention-free transmit period in step 720 based on the amount of traffic buffered in one or more of the mesh member nodes. This estimate may then be used to terminate the contention-free transmit period. Specifically, when the estimated duration expires, the MAC driver 635 within each of the mesh member nodes (or the master mesh member node MAC driver 635) may determine that the contention-free transmit period should end. Alternatively, the MAC driver 635 within each of the mesh member nodes (or master mesh member node MAC driver 635) may determine that the contention-free transmit period should end when the pending number of transactions fall below a threshold, all queued transfers are completed, a timer expires, or the like.

If, in step 750, the MAC driver 635 within each of the mesh member nodes (or the master mesh member node MAC driver 635) determines that the contention-free mode should end, then in step 760 the MAC driver 635 within each of the mesh member nodes (or the master mesh member node MAC driver 635) sets the NAV to a value other than infinity. Alternatively, a specific frame, similar to a contention-free end frame that is used inside of a single BSS, is sent by a single mesh member node, such as the master mesh member node, to end the contention-free transmit period. The specific frame may be a broadcast message to ensure that all mesh member nodes receive and transmit the contention-free end frame. Persons skilled in the art will appreciate that any system configured to perform the method steps of FIG. 7 or its equivalent, is within the scope of the present invention.

Separating the transfer of station-to-mesh-node traffic from mesh-node-to-mesh-node traffic may reduce the number of collisions within the self-configuring mesh network, thereby significantly improving network efficiency and performance. Using the mechanisms specified by the IEEE 802.11 standard to initiate and end the transfer of queued inter-mesh node traffic permits non-mesh-aware stations to operate within the self-configuring mesh network with mesh-aware mesh member nodes that use contention-free transmit periods to transfer the inter-mesh node traffic.

The invention has been described above with reference to specific embodiments. Persons skilled in the art, however, will understand that various modifications and changes may be made thereto without departing from the broader spirit and scope of the invention as set forth in the appended claims. For example, the functionality described above in conjunction with FIGS. 2-5C and FIG. 7 may be implemented in software and/or hardware. With respect to computing device 600 of FIG. 6, hardware and software elements other than those conforming to the IEEE 802.11 standard may be used implement the methodology of FIGS. 2-5C and FIG. 7.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of joining a self-configuring mesh networking system, comprising:
    sending a first meshHello message from a wireless station system on a reserved multicast address to a neighboring mesh node within the self-configuring mesh networking, wherein the neighboring mesh node is configured to not forward messages received on the reserved multicast address;
    receiving a second meshHello message generated by the neighboring mesh node;
    determining whether the second meshHello message includes a first neighbor list that includes the wireless station attempting to join the self-configuring mesh networking system; and
    adding the neighboring mesh node to a second neighbor list stored in the wireless station.

2. The method of claim 1, further comprising requesting a topology database exchange from the neighboring mesh node.

3. The method of claim 2, wherein the topology database includes mesh attributes measured by the neighboring mesh node.

4. The method of claim 2, wherein the topology database includes metrics, computed by the neighboring mesh node, based on measured mesh attributes.

5. The method of claim 2, wherein the neighboring node and the wireless station are configured to store a local copy of an anchor tree topology including nodes in the mesh networking system that are associated with the exactly one anchor node.

6. The method of claim 1, wherein the first meshHello message includes a digital signature.

7. The method of claim 1, further comprising outputting the second neighbor list to discover additional neighbor mesh nodes.

8. The method of claim 7, wherein the second neighbor list is sent to the neighboring mesh node or another neighbor on the reserved multicast address to discover additional neighbor mesh nodes.

9. The method of claim 7, wherein the second neighbor list is sent to the neighboring mesh node or another neighbor on the reserved multicast address to discover additional neighbor mesh nodes.

10. The method of claim 1, wherein the neighboring mesh node is coupled to a wired network.

11. The method of claim 1, further comprising responding to a request for association received from another wireless station attempting to join the self-configuring mesh networking system.

12. The method of claim 1, further comprising the step of associating with exactly one anchor node of multiple anchor nodes that are coupled to a wired network.

13. A method for discovering a topology of a mesh networking system, comprising:
    receiving, on a reserved multicast address, a first meshHello message sent by a wireless station neighboring a mesh node within the mesh networking system, wherein the mesh node is configured to not forward messages received on the reserved multicast address;
    adding the wireless station to a list of neighbors stored within the mesh node, wherein the list of neighbors specifies a portion of the topology of the mesh networking system; and
    sending the list of neighbors to the wireless station.

14. The method of claim 13, further comprising:
    generating a database update indicating that the wireless station is a neighbor of the mesh node; and
    sending the database update to other neighbors of the mesh node.

15. The method of claim 13, wherein the mesh node is coupled to a wired network.

16. The method of claim 13, wherein the mesh node is associated with exactly one anchor node of multiple anchor nodes that are coupled to a wired network.

17. The method of claim 13, wherein the mesh node and the wireless station are configured to store a local copy of an anchor tree topology including nodes in the mesh networking system that are associated with the exactly one anchor node.

* * * * *